United States Patent [19]
Kim et al.

[11] Patent Number: 6,158,112
[45] Date of Patent: Dec. 12, 2000

[54] DISK ASSEMBLY DEVICE FOR ADJUSTING THE DISK BALANCE OF THE HARD DISK DRIVE

[75] Inventors: In-Su Kim, Gumi; Kwang-Kyu Kim, Ahnyang, both of Rep. of Korea

[73] Assignee: SamSung Electronics Co., Ltd., Suwon, Rep. of Korea

[21] Appl. No.: 08/966,540

[22] Filed: Nov. 10, 1997

[30] Foreign Application Priority Data

Nov. 9, 1996 [KR] Rep. of Korea .................. 96-53058

[51] Int. Cl.$^7$ .................................................. G11B 5/42
[52] U.S. Cl. ........................... 29/759; 29/603.03; 29/760; 360/98.07; 360/99.08
[58] Field of Search ................. 29/603.03, 759, 29/760; 360/98, 7, 99.08

[56] References Cited

U.S. PATENT DOCUMENTS

| | | |
|---|---|---|
| 4,224,648 | 9/1980 | Roling . |
| 4,272,795 | 6/1981 | Davis, Jr. et al. . |
| 4,358,803 | 11/1982 | Van Der Giessen . |
| 4,697,216 | 9/1987 | Tsukahara . |
| 4,933,927 | 6/1990 | Ross . |
| 4,989,107 | 1/1991 | Tsukahara . |
| 5,010,427 | 4/1991 | Taguchi et al. . |
| 5,121,272 | 6/1992 | Maekawa et al. . |
| 5,610,900 | 3/1997 | Yamashita et al. . |

FOREIGN PATENT DOCUMENTS

| | | |
|---|---|---|
| 35 40 623 | 5/1987 | Germany . |
| 38 16975 A1 | 11/1989 | Germany . |
| 42 12 665 | 2/1996 | Germany . |
| 195 45 881 | 6/1997 | Germany . |

Primary Examiner—Carl E. Hall
Attorney, Agent, or Firm—Robert E. Bushnell, Esq.

[57] ABSTRACT

A disk drive recording device comprises at least two platters for storing magnetic recording data and a spindle motor rotating at high speed for mounting the platters. The disk drive is assembled by using pushing devices to push the platters toward the center of the spindle motor in respective directions to bring a portion of an inside circumference of a concentric center hole of each of the platters in contact with an outer circumference of the spindle motor so that the center of gravity of each platter coincides with a center axis of the spindle motor.

37 Claims, 8 Drawing Sheets

DISK ASSEMBLY DEVICE FOR ADJUSTING THE DISK BALANCE OF THE HARD DISK DRIVE

CLAIM OF PRIORITY

This application makes reference to, incorporates the same herein, and claims all benefits accruing under 35 U.S.C. §119 from an application for DISK ASSEMBLY METHOD AND DEVICE FOR ADJUSTING THE DISK BALANCE OF THE HARD DISK DRIVE earlier filed in the Korean Industrial Property Office on Nov. 9, 1996 and there duly assigned Ser. No. 53058/1996.

BACKGROUND OF THE INVENTION

1. Technical Field

The present invention relates to the balance adjustment of platters when assembling a hard disk drive, and more particularly to a method and device for balancing platters on the shaft of the spindle motor when fixing the platters on the spindle motor.

2. Related Art

The hard disk drive used as an auxiliary storage device for recording or retrieving information on and from magnetic disks by using read/write heads consists of a main base, a mounting frame with casing, a plurality of platters, a spindle motor for supporting and rotating the above platters, a plurality of magnetic heads (or transducers) for recording and retrieving data, an actuator for controlling the position of the above magnetic heads by means of a voice coil motor (VCM), circuitry for controlling the above actuator and electrical processing, and an interface for connecting the disk drive and the host computer.

A substantial problem in assembling such a hard disk drive relates to adjustment of the disk balance within the hard disk drive. Manual methods for adjusting this balance are quite time consuming and are subject to human error. As stated below, highly expensive balancing machines have been developed in order to balance check the platters of a hard disk drive, but a large amount of disk assembly time is generally required. Furthermore such balancing machines of the prior art are not only highly expensive, but also very complex. Thus, there is a need in the prior art for the development of a disk assembly method and device which is simpler and less complex, and which requires a smaller amount of disk assembly time.

The following patents are considered to be representative of the prior art relative to the invention described above, but are burdened by the disadvantages discussed above and below: U.S. Pat. No. 5,610,900 to Yamashita et al., entitled Centering Device Of An Optical Disk Player; U.S. Pat. No. 5,121,272 to Maekawa et al., entitled Apparatus For Centering The Magnetic Disc In A Magnetic Disc Drive, U.S. Pat. No. 5,010,427 to Taguchi et al., entitled Apparatus For Positioning A Magnetic Disk On A Disk Drive, U.S. Pat. No. 4,989,107 to Tsukahara, entitled Microfloppy Disk Drive With Centering Mechanism, U.S. Pat. No. 4,933,927 to Ross, entitled Disk Centering Method And Apparatus For Centering Disks For Disk Drives, U.S. Pat. No. 4,697,216 to Tsukahara, entitled Disk Drive Apparatus With Automatic Centering Arrangement, U.S. Pat. No. 4,358,803 to Van Der Giessen, entitled Arrangement For Centering An Information Disc, U.S. Pat. No. 4,272,795 to Davis Jr. et al., entitled Information Storage System And Recording Cartridge Having Precise Alignment Features, and U.S. Pat. No. 4,224,648 to Roling, entitled Disc Centering.

SUMMARY OF THE INVENTION

Accordingly, it is an object of the present invention to provide a disk assembly method and device capable of adjusting the balance of the platters by means of a simple disk assembly jig when fixing the platters on the spindle motor of the hard disk drive.

It is another object of the present invention to provide a disk assembly method and device capable of reducing the disk assembly time and the production and maintenance cost by using a simple disk assembly jig for adjusting the balance of the platters.

It is another object of the present invention to provide a disk assembly device capable of guaranteeing the reliability of the hard disk drive by assembling the platters precisely in balance in such fashion as to prevent vibration during rotation thereof.

According to the present invention, a disk drive recording device consisting of at least two platters for storing magnetic recording data and a spindle motor rotating at high speed for mounting the platters is assembled by using pushing devices to push the platters toward the center of the spindle motor in respective directions to bring a portion of the inside circumference of the concentric center hole of each of the platters in contact with the outer circumference of the spindle motor so that the center of gravity of the platters coincides with a center axis of the spindle motor.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
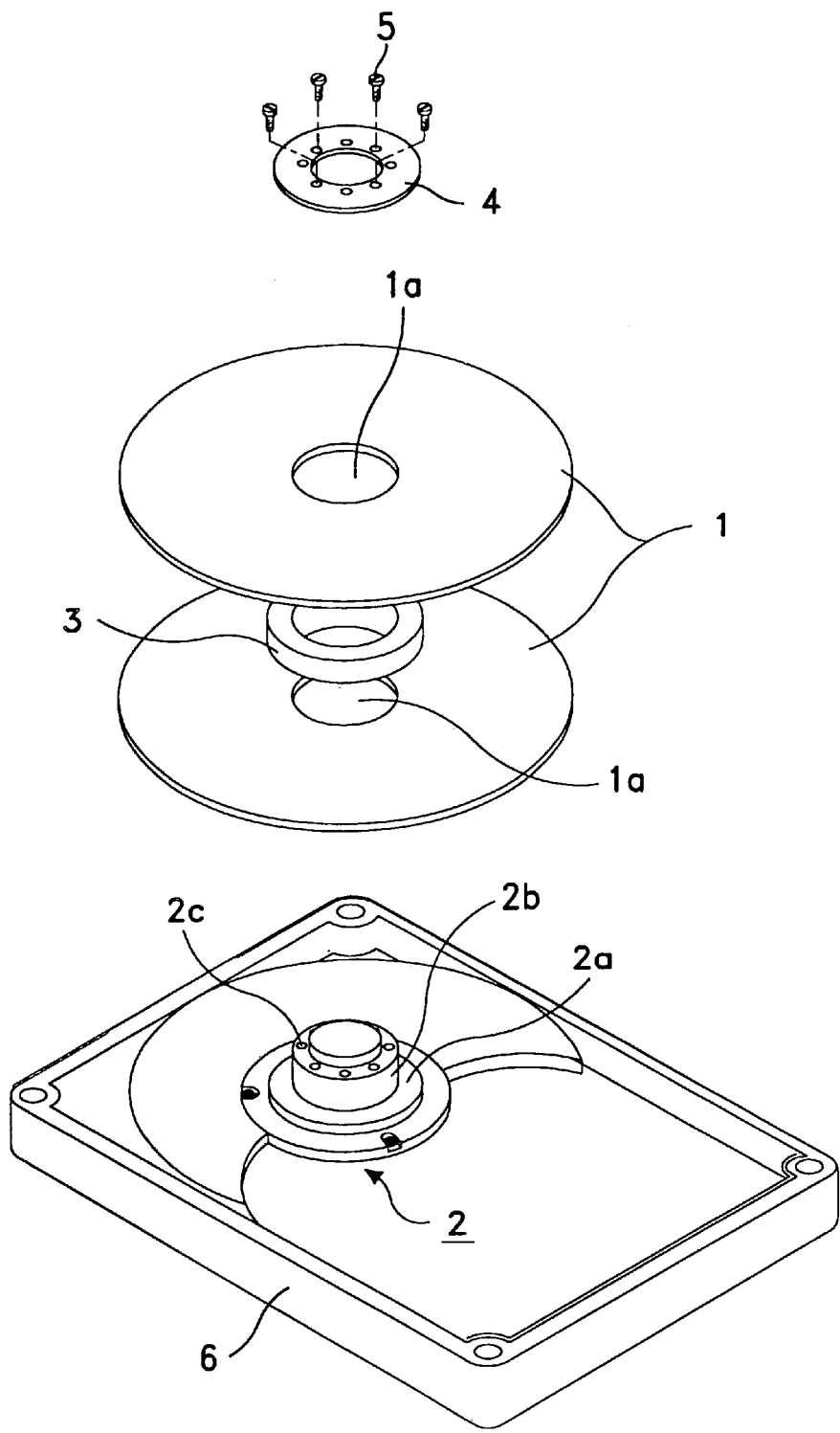
FIG. 1 is an exploded perspective view of a conventional hard disk drive.
Figure 2:
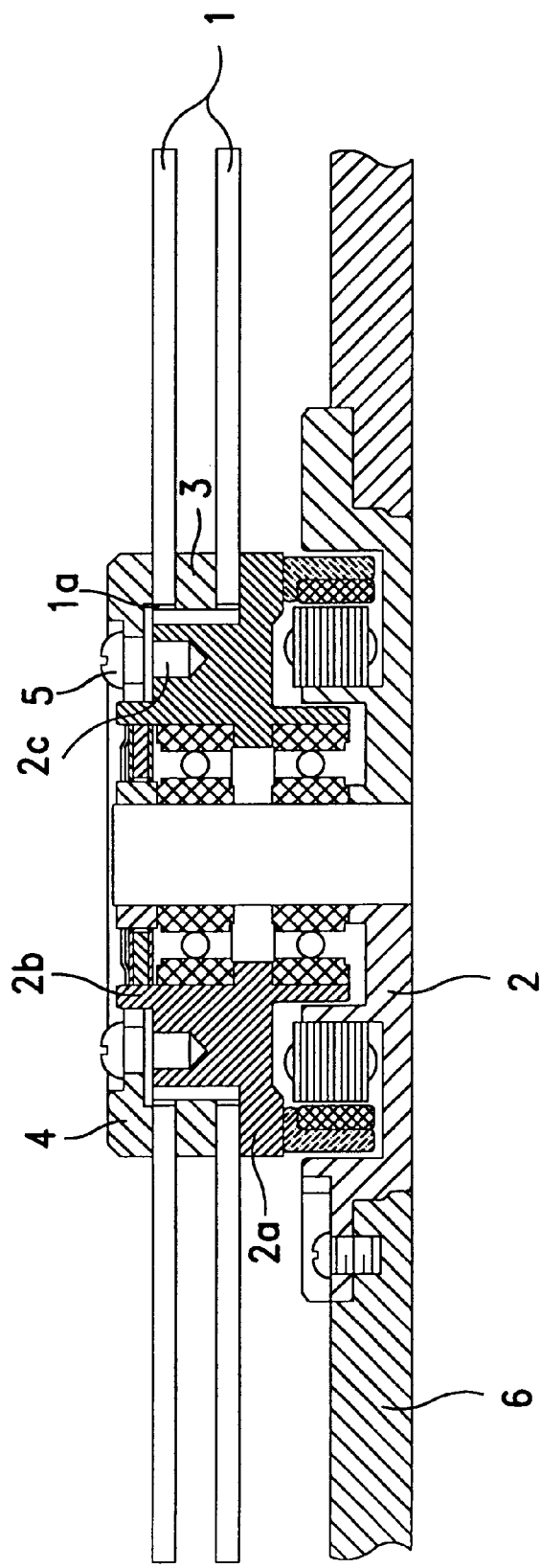
FIG. 2 is a sectional side view of the assembled platters of the conventional hard disk drive.

Generally, in order to fix disks (platters) 1 on the spindle motor 2 installed on a main base 6 as shown in FIG. 1, the platters 1 each have concentric center holes 1a formed in the center thereof, and the spindle motor 2 is provided with a support 2a and a hub 2b. Further, the hub 2b is provided with a plurality of screw holes 2c with dummy taps formed on the upper annular circumference thereof. When fixing the platters 1 on the spindle motor 2, a spacer 3 is interposed between the platters 1 in such fashion as to position both platters 1 parallel to each other, maintaining a uniform space therebetween, thereby fastening the platters 1 firmly on the hub 2b of the spindle motor 2 by means of a clamp 4.

To explain the fixing of the platters on the spindle motor 2, the platters 1 are placed on the hub 2b, which is inserted through the concentric center holes 1a of the platters 1, whereby the lowest platter 1 is seated on the support 2a, and a spacer 3 is placed onto the hub 2b above the lower platter 1. Then, another platter 1 is placed onto the hub 2b above the spacer 3. Finally, the clamp 4 is placed on top of the hub 2b, and fastened thereon by means of four screws 5 by fastening the screws 5 in the order of diagonal directions so as to press the platter 1 via the clamp 4 to firmly fix the platters 1 on the hub 2b, and thus on the spindle motor 2.

Figure 3:
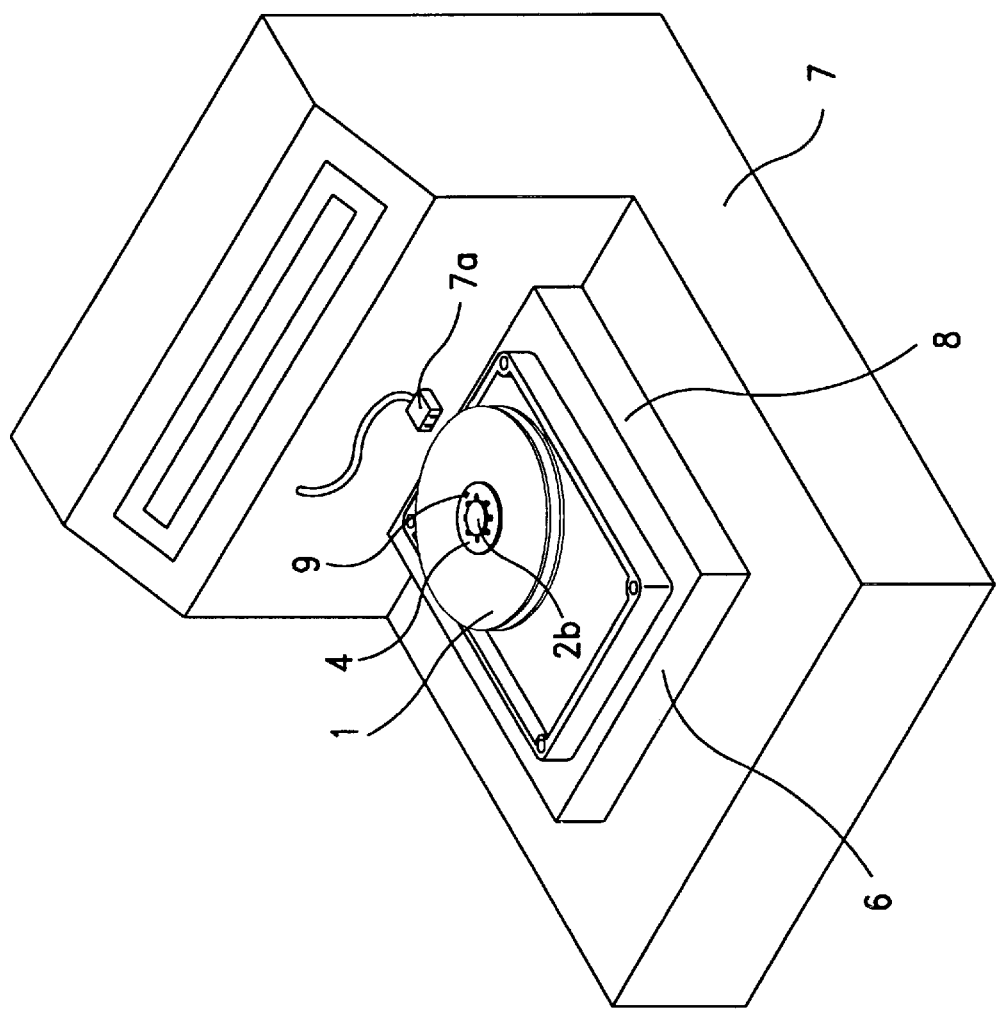
FIG. 3 is an explanatory perspective view of the conventional balancing machine illustrating the detection of the balance state of platters mounted on the spindle motor.
Figure 4:
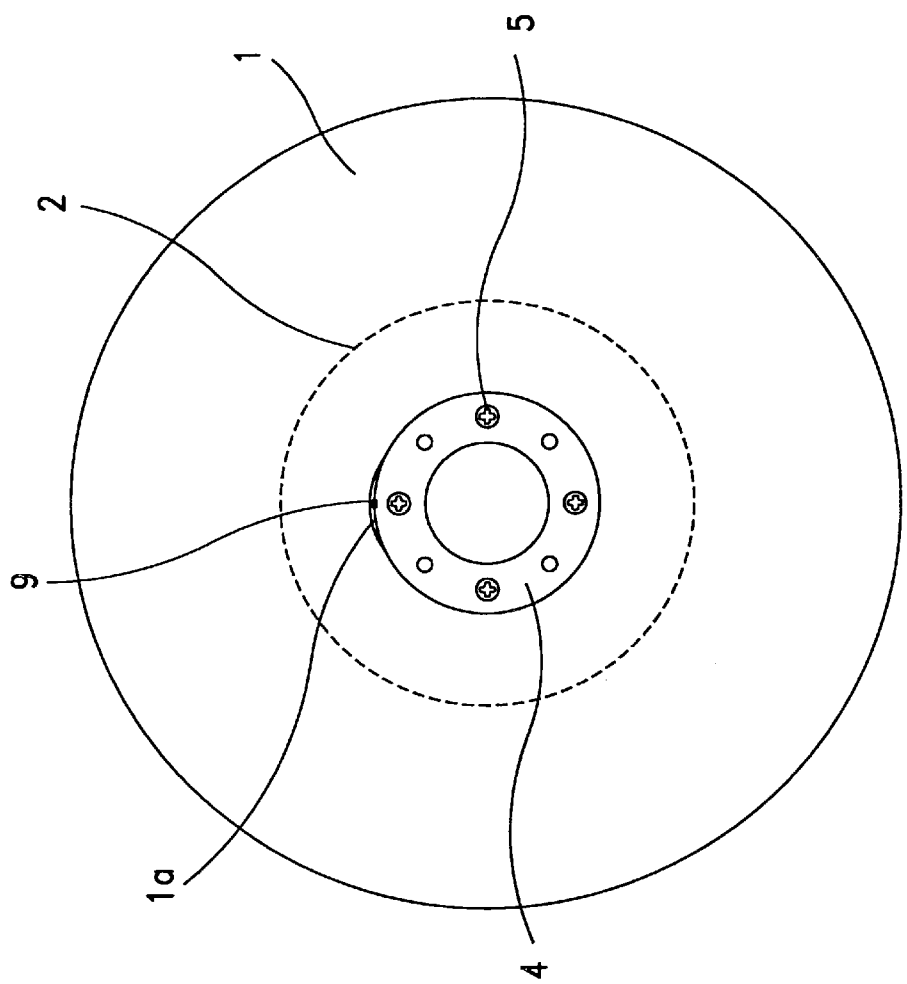
FIG. 4 is a top plan view of the conventional platter illustrating the state of the balanced installation on the hub of the spindle motor.

In order to balance the platters 1 when fixing them on the spindle motor 2 according to the prior art, as shown in FIGS. 3 and 4, the platters 1 and the spacer 3 are installed on the hub 2b of the spindle motor 2 mounted on the main base 6, and then the clamp 4 is temporary fastened onto the hub 2b. Thereafter, the temporary base assembly 6 is placed on a stationary plate 8 of a balancing machine 7. Then, a piece of reflective tape 9 is attached on one side of the temporary assembled clamp 4, whereby the spindle motor 2 is rotated to spin the platters 1, so that the reflection detector 7a of the balancing device 7 can detect the reflection angle of the reflective tape 9 to measure and indicate the balance state of the platters 1. In order to adjust the unbalanced disk portion detected, the clamp 4 is screwed tightly onto the hub 2b by using screws with different weight, thereby driving four screws 5 into the respective holes 2c having dummy taps in the order of diagonal directions, so that the platters 1 are fixed in balance on the hub 2b of the spindle motor 2.

As suggested above, the platters cannot be precisely loaded on the hub 2b by centering thereon because of the assembly tolerance between the hub 2b of the spindle motor 2 and the concentric center holes 1a of the platters 1. This causes an imbalance between the spindle motor 2, and the disk drive system, thereby damaging the internal bearing of the spindle motor 2. Accordingly, the platters 1 are vibrated when spinning, thereby affecting adversely the flying heads. Consequently, highly expensive balancing machines have been required for the balance checking of the platters, and also a large amount of disk assembly time has been needed, and this is a drawback of the prior art.

Figure 5:
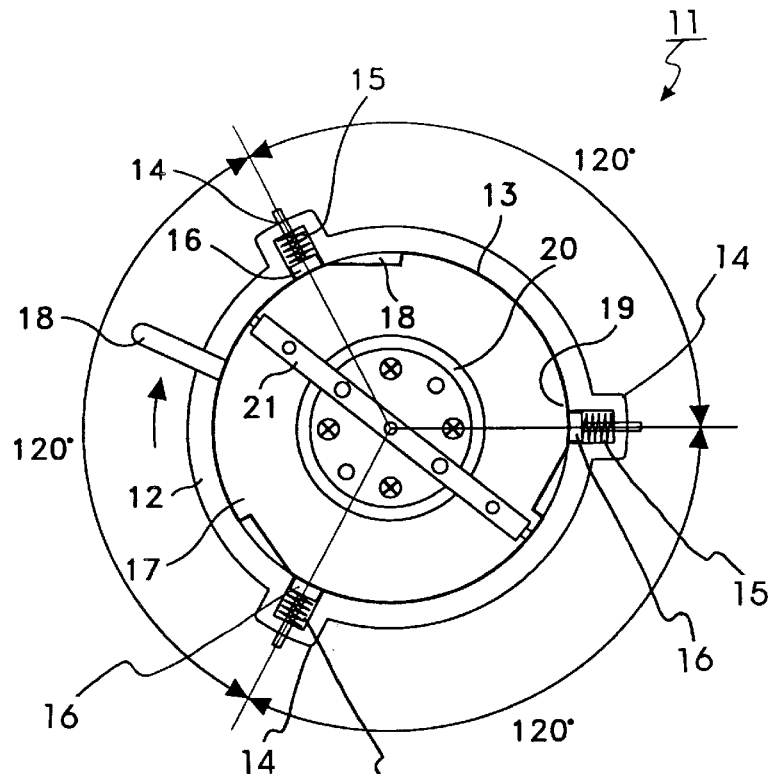
FIG. 5 is a top plan view of the disk balancing assembly jig for fixing platters in balance on the hub of the spindle motor according to the present invention.
Figure 6:
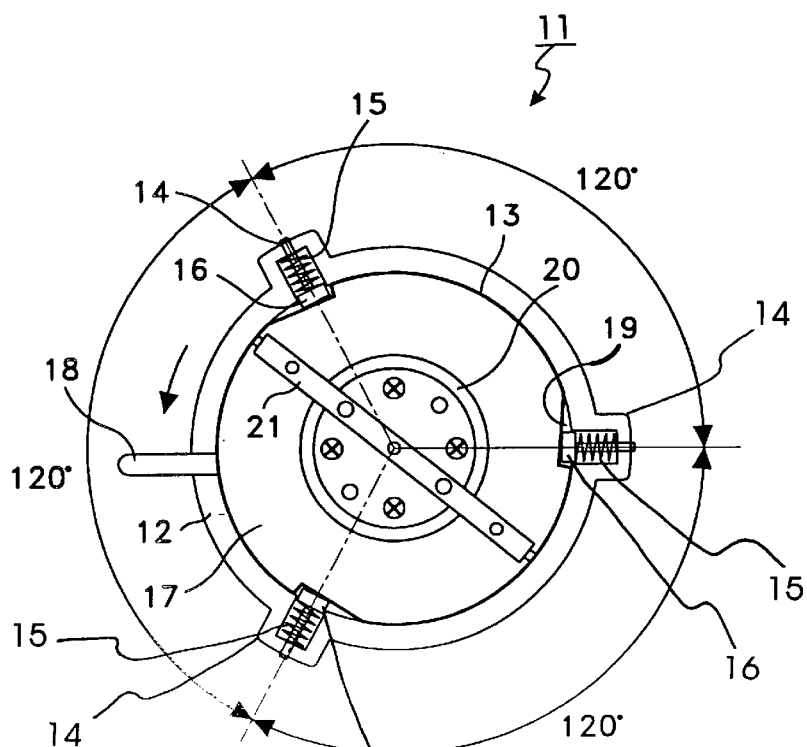
FIG. 6 is a top plan view of the disk balancing assembly jig illustrating the operation thereof according to the present invention.
Figure 8:
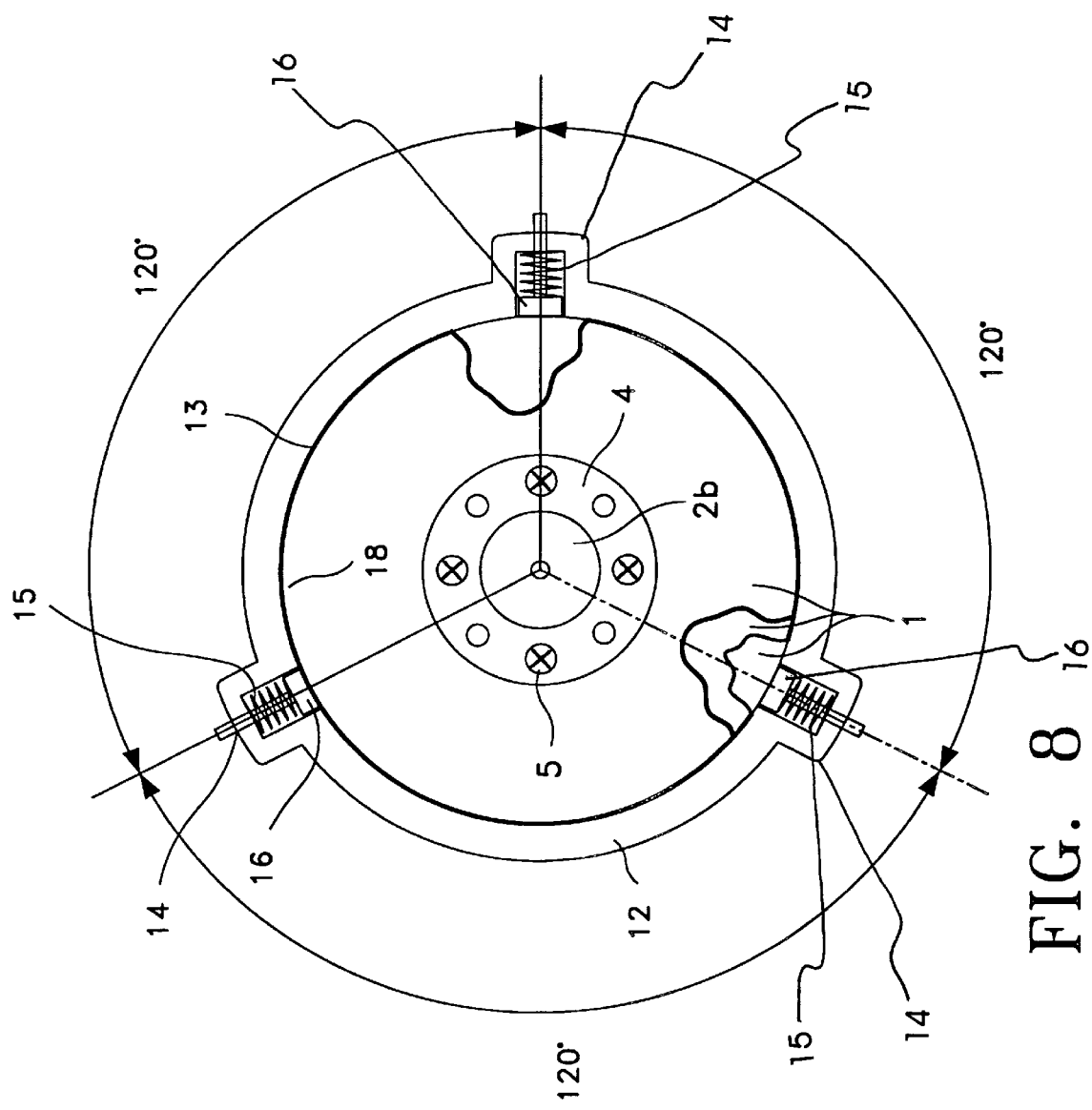
FIG. 8 is a top plan view of the disk balancing assembly jig illustrating the balance adjusting process for three platters temporary mounted on the hub of the spindle motor according to the present invention.
Figure 9:
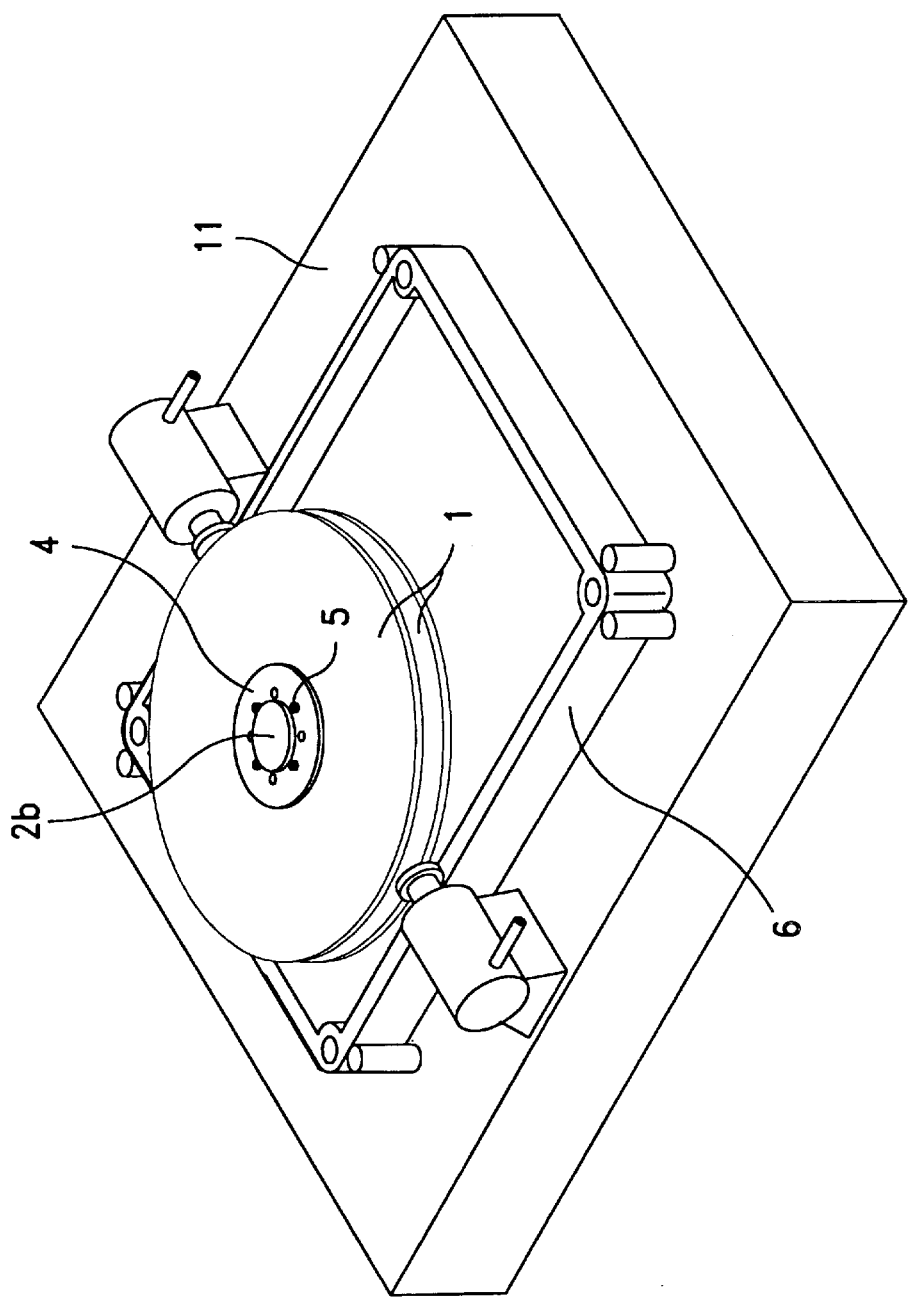
FIG. 9 is a perspective view of the disk balancing assembly jig on which the hard disk drive is mounted to adjust its balance according to the present invention.

The disk balancing assembly jig 11 according to the present invention is used for adjusting the balance of two or three platters mounted on the spindle motor of the hard disk drive. As shown in FIGS. 5, 6, 8, the disk balancing assembly jig 11 consists of a cylindrical main body 12 having center hole 13, into which the platters 1 are inserted, and on the inside wall of which two or more guide holes 14 are provided in specified intervals. The push pins 16 are each inserted into the above guide holes 14 together with springs 15 so as to push the platters 1. A separate annular plate 17 is mounted onto the center hole 13 of the above main body 12, wherein an annular plate lever 18 is provided laterally on the side of the annular plate 17 to turn the annular plate 17, and guide recesses 19 are formed on the periphery of the annular plate 17. Further, a concentric hole 20 is formed in the center of the above annular plate 17 to receive the hub 2b of the spindle motor 2 therethrough. Further, a bar-like holder 21 is installed on top of the above annular plate 17 so as to be guided on both ends, turning along the cylindrical inside wall.

The above pushing devices, each consisting of guide holes 14, springs 15, and push pins 16, can be provided on the inside wall of the main body 12 in two ways as follows. Firstly, when installing two platters 1 on the hub 2b of the spindle motor 2, two pushing devices can be provided on the inside wall of the main body 12, each in opposing positions spaced apart at a 180 degree interval, to push the respective platters 1, adjusting the balance of the platters 1 on the center of the spindle motor 2. Secondly, when installing three platters 1 on the hub 2b of the spindle motor 2, three pushing devices can be provided on the inside wall of the main body 12, each separated by 120 degrees, to push the respective platters 1, adjusting the balance of the platters 1 so that the center of gravity thereof coincides with a center axis of the spindle motor 2.

As depicted in FIGS. 5 and 6, when turning the annular plate lever 18 clockwise to turn the annular plate 17, the push pins 16 are pushed up from the guide recesses 19 into the guide holes 14 by the annular plate 17. On the contrary thereto, when turning the annular plate lever 18 counterclockwise, the push pins 16 are pushed out from the guide holes 14 into the guide recesses 19 by being brought in line with each other.

Figure 7:
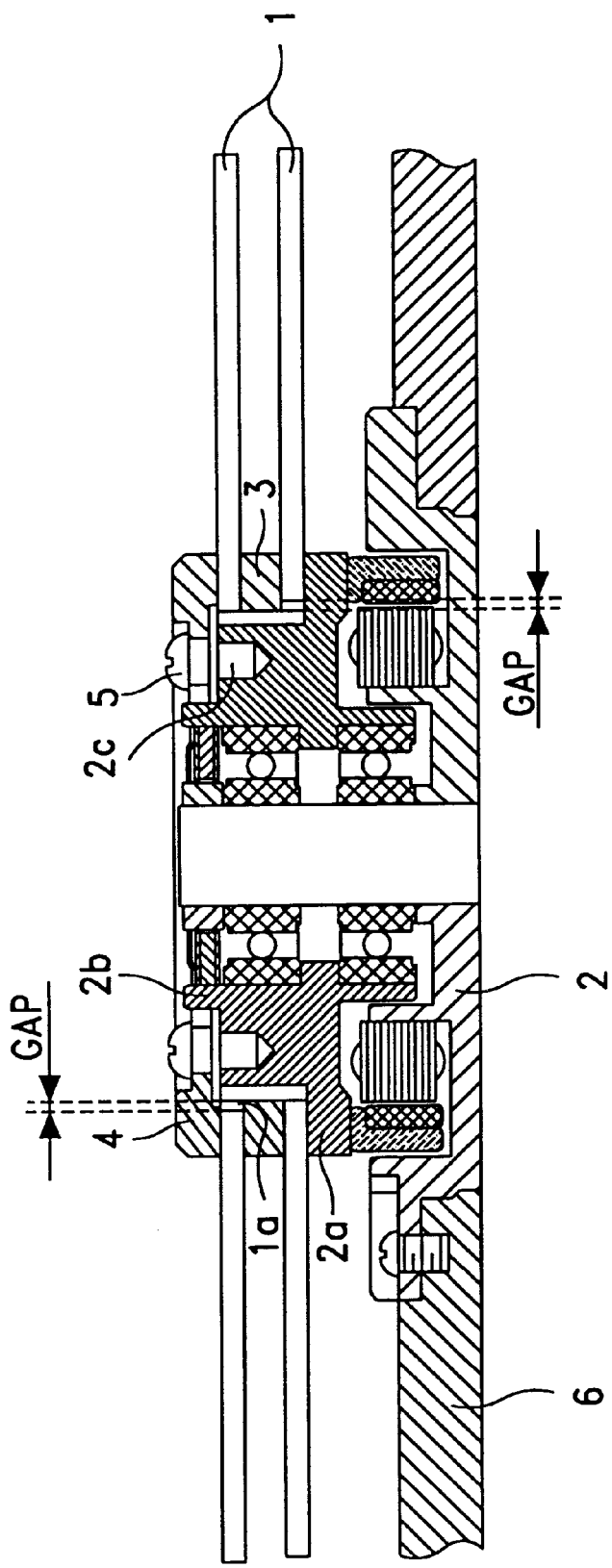
FIG. 7 is a sectional side view of assembled platters illustrating two platters placed in balance on the hub of the spindle motor by means of the disk balancing assembly jig under the state of the temporary assembly according to the present invention.

Referring to FIG. 7, the hard disk drive consists of a main base 6, a spindle motor 2 mounted on the above main base 6 and provided with a disk support 2a and a hub 2b having a plurality of screw holes 2c on its upper annular circumference, two or more magnetic recording platters 1 mounted on the above hub 2b, each having a concentric center hole 1a, one or more spacers 3 each interposed between two platters 1 to maintain a uniform and even spacing, and a clamp 4 fixing the above platters 1 firmly on the hub 2b of the spindle motor 2.

In order to fix the platters 1 in balance on the above spindle motor 2, the first lowest platter 1 is fitted onto the hub 2b of the spindle motor 2 via the fixing center hole 1a, whereby the above first platter 1 is seated on the support 2a. Next, a spacer 3 is fitted onto the hub 2b, and then another platter 1 is fitted onto the hub 2b above the first spacer 3, stacking one platter above another. Finally, the clamp 4 is placed on top of the hub 2b and fastened thereon by driving the screws 5 into the screw holes 2c in the order of diagonal positions, thereby temporarily fixing the platters 1 on the hub 2b.

Under the above temporary assembly state, the installed platters 1 are unbalanced because of the GAPs between the hub 2b and the fixing center holes 1a. Accordingly, in order to fix the platters 1 on the hub 2b in balance, the present invention employs an inventive disk balancing assembly jig 11 to assemble the platters 1 in balance, centering them on the hub 2b of the spindle motor 2.

The inventive assembly method for adjusting the balances of the platters 1 to position the center of gravity on the hub 2b of the spindle motor 2 according to the number of platters 1 by using the above disk balancing assembly jig 11 comprises the following steps: fixedly mounting the spindle motor 2 on the main base 6 by temporarily fastening the clamp 4 on the hub 2b of the spindle motor 2 after installing the platters 1 and the spacers 3 by pairs thereon, stacking one pair above another; installing the disk balancing assembly jig 11 by enclosing the platters 1 temporarily mounted on the hub 2b of the spindle motor 2, whereby the pushing devices installed in the guide holes 14 on the inside wall of the main body 12 closely contact the annular plate 17 rotated by the lever 18 provided laterally on the side of the annular plate 17 above the upper part of the center hole 13 of the main body 12, the hole 20 concentrically formed in the center of the annular plate 17 receives the hub 2b, and the bar-like holder 21 is installed on top of the above annular plate 17; pushing each of the platters 1 toward the center of the spindle motor 2 by means of the push pins 16 of the pushing devices by bringing the guide holes 14 in line with the guide recesses 19, wherein the push pins 16 are pushed out from or pushed back into the guide holes 14 when turning the annular plate 17 counterclockwise or clockwise, respectively; and completely fastening the clamp 4 to the hub 2b of the spindle motor 2 by driving four screws 5 into the respective screw holes 2c provided on the upper annular circumference of the hub 2b in the order of diagonal positions so as to fix the platters 1 in balance on the hub 2b.

To describe the assembly process for fixing the platters 1 on the hub 2b of the spindle motor 2 by using the disk balancing assembly jig 11 of the present invention, when installing the disk balancing assembly jig 11 by enclosing the platters 1 temporarily mounted on the hub 2b of the spindle motor 2, the push pins 16 provided in the guide holes 14 of the main jig body 12 are pushed back into the guide holes 14 within the jig body 12 by the annular plate 17 which is rotated by the annular plate lever 18 provided laterally on the side of the annular plate 17 above the upper part of the center hole 13 of the main body 12, the hole 20 formed in the center of the annular plate 17 is placed on the hub 2b, and the bar-like holder 21 is installed on top of the above annular plate 17 so as to be guided on both ends, turning along the cylindrical inside wall of the center hole 13 of the main body 12.

Under the above conditions, when turning the annular plate lever 18 of the disk balancing assembly jig 11 counterclockwise to adjust the balance of the platters 1, the annular plate 17 rotates counterclockwise so as to bring the guide holes 14 of the main body 12 in line with the guide recesses 19 of the annular plate 17, whereby the push pins 16 are pushed into the guide recesses 19 by the springs 15, pushing the platters 1 toward the center of the spindle motor 2.

In the case where two platters 1 are mounted on the hub 2b of the spindle motor 2 as shown in FIG. 7, the push pins 16 are provided in opposing positions at an interval of 180 degrees so as to push each of the two platters 1 toward the hub 2b, whereby the center of gravity is centered on the hub 2b of the spindle motor 2 and the balances of the platters 1 are maintained, so that the platters 1 can be fixed in balance on the hub 2b of the spindle motor 2 by fastening the clamp 4 to the hub 2b, driving four screws 5 into the screw holes 2c provided on the upper annular circumference of the hub 2b in the order of diagonal positions.

In the case where three platters 1 are mounted on the hub 2b of the spindle motor 2 as shown in FIG. 8, the push pins 16 are provided at three positions located 120 degrees apart so as to push each of the three platters 1 toward the hub 2b, whereby the center of gravity is centered on the hub 2b of the spindle motor 2 and the balances of the platters 1 are maintained, so that the platters 1 can be fixed in balance on the hub 2b of the spindle motor 2 by fastening the clamp 4 to the hub 2b, driving four screws 5 into the screw holes 2c provided on the upper annular circumference of the hub 2b in the order of diagonal positions.

As described above, after installing the platters 1 on the hub 2b of the spindle motor 2, the annular plate lever 18 of the disk balancing assembly jig 11 is turned clockwise to rotate the annular plate 17 clockwise, whereby the push pins 16 are pushed out of the guide recesses 19 so as to be pushed back into the guide holes 14 within the jig body 12, and then the disk balancing assembly jig 11 is separated from the platters 1, maintaining the platters 1 in balance fixed on the hub 2b of the spindle motor 2.

As mentioned above, the present invention has the advantage in that the disk assembling time can be cut down and the production and maintenance cost can be significantly reduced by using a simple disk assembly jig, and the present invention can considerably improve the reliability of the hard disk drive by assembling the platters precisely in balance in such fashion to prevent the vibration during operations in practice.

What is claimed is:

1. For use in a disk drive recording device comprising at least two platters for storing magnetic recording data and a spindle motor rotating at high speed and having a hub on which said platters are mounted, a disk fixing device comprising a main body having pushing devices for pushing an outer circumference of said platters, and an annular plate for covering a top portion of said platters, wherein said annular plate has a center hole formed therein for receiving the hub of said spindle motor.

2. A disk fixing device as defined in claim 1, wherein said annular plate has a lever for moving said pushing devices to a first position to push said platters and to a second position for not pushing said platters.

3. A disk fixing device as defined in claim 1, wherein each of said pushing devices comprises a push pin and a surrounding spring.

4. A device for adjusting a balance of at least two platters of a hard disk drive, comprising:

a cylindrical main body having a center hole for receiving said at least two platters, said cylindrical main body having an inner wall surrounding said center hole and at least two guide holes provided at given intervals along said inner wall;

pushing means, one for each of said at least two guide holes, inserted into said at least two guide holes for pushing said at least two platters; and an annular plate mounted in said center hole and having an annular plate lever disposed on a side of said annular plate for rotating said annular plate;

wherein, when said annular plate is rotated in a first direction, said pushing means pushes said at least two platters; and wherein, when said annular plate is rotated in a second direction opposite to said first direction, said pushing means withdraws from said at least two platters.

5. A device of claim 4, wherein each said pushing means comprises a push pin mounted on said inner wall of said cylindrical main body, and a spring surrounding said push pin.

6. The device of claim 5, wherein said at least two platters comprises two platters, and wherein said push pins are mounted on said inner wall of said cylindrical main body at intervals of 180 degrees.

7. The device of claim 5, wherein said at least two platters comprises three platters, and wherein said push pins are mounted on said inner wall of said cylindrical main body at intervals of 120 degrees.

8. The device of claim 5, further comprising at least two guide recesses formed on a periphery of said annular plate.

9. The device of claim 8, wherein, when said annular plate is rotated in said first direction, said push pins are moved out of said at least two guide holes into said at least two guide recesses.

10. The device of claim 8, wherein, when said annular plate is rotated in said second direction, said push pins are moved out of said at least two guide recesses and into said at least two guide holes.

11. The device of claim 4, wherein, when said annular plate is rotated in said first direction, said pushing means moves out of said at least two guide holes.

12. The device of claim 4, wherein, when said annular plate is rotated in said second direction, said pushing means is moved into said at least two guide holes.

13. The device of claim 4, further comprising a holder installed on top of said annular plate.

14. For use in a disk drive recording device comprising first and second platters for storing magnetic recording data, a hub having said platters fixedly mounted thereon, and a spindle motor connected to said hub for driving said hub with said platters mounted thereon, wherein an inside circumference of a center hole of said first platter has a gap at a portion contacting an outer circumference of said spindle motor in a first direction, and an inside circumference of a center hole of said second platter has a gap at a portion contacting the outer circumference of said spindle motor in a second direction opposite to said first direction;
  a disk fixing device comprising a main body having pushing devices for pushing an outer circumference of said platters, and an annular plate for covering a top portion of said platters, wherein said annular plate has a center hole formed therein for receiving said hub.

15. A disk fixing device as defined in claim 14, wherein said annular plate has a lever for moving said pushing devices to a first position to push said platters and to a second position for not pushing said platters.

16. A disk fixing device as defined in claim 14, wherein each of said pushing devices comprises a push pin and a surrounding spring.

17. For use in a disk drive recording device comprising first and second platters for storing magnetic recording data, a hub having said platters fixedly mounted thereon, and a spindle motor connected to said hub for driving said hub with said platters mounted thereon, wherein an inside circumference of a center hole of said first platter has a gap at a portion contacting an outer circumference of said spindle motor in a first direction, and an inside circumference of a center hole of said second platter has a gap at a portion contacting the outer circumference of said spindle motor in a second direction opposite to said first direction;
  a device for adjusting a balance of said first and second platters, comprising:
    a cylindrical main body having a center hole for receiving said platters, said cylindrical main body having an inner wall surrounding said center hole and at least two guide holes provided at given intervals along said inner wall;
    pushing means, one for each of said at least two guide holes, inserted into said at least two guide holes for pushing said platters; and
    an annular plate mounted in said center hole and having an annular plate lever disposed on a side of said annular plate for rotating said annular plate;
    wherein, when said annular plate is rotated in a first direction, said pushing means pushes said platters; and
    wherein, when said annular plate is rotated in a second direction opposite to said first direction, said pushing means withdraws from said platters.

18. A device as defined in claim 17, wherein each said pushing means comprises a push pin mounted on said inner wall of said cylindrical main body, and a spring surrounding said push pin.

19. A device as defined in claim 18, wherein said push pins are mounted on said inner wall of said cylindrical main body at intervals of 180 degrees.

20. A device as defined in claim 18, further comprising a third platter, and wherein said push pins are mounted on said inner wall of said cylindrical main body at intervals of 120 degrees.

21. A device as defined in claim 18, further comprising at least two guide recesses formed on a periphery of said annular plate.

22. A as defined in claim 21, wherein, when said annular plate is rotated in said first direction, said push pins are moved out of said at least two guide holes into said at least two guide recesses.

23. A device as defined in claim 21, wherein, when said annular plate is rotated in said second direction, said push pins are moved out of said at least two guide recesses and into said at least two guide holes.

24. A device as defined in claim 17, wherein, when said annular plate is rotated in said first direction, said pushing means moves out of said at least two guide holes.

25. A device as defined in claim 17, wherein, when said annular plate is rotated in said second direction, said pushing means is moved into said at least two guide holes.

26. A device as defined in claim 17, further comprising a holder installed on top of said annular plate.

27. For use in a disk drive recording device comprising first, second and third platters for storing magnetic recording data, a hub having said platters fixedly mounted thereon, and a spindle motor connected to said hub for driving said hub with said platters mounted thereon, wherein an inside circumference of a center hole of said first platter has a gap at a portion contacting an outer circumference of said spindle motor in a first direction, an inside circumference of the center hole of said second platter has a gap at a portion contacting the outer circumference of said spindle motor in a second direction separated from said first direction by 120 degrees, and an inside circumference of a center hole of said third platter has a gap at a portion contacting the outer circumference of said spindle motor in a third direction separated from said second direction by 120 degrees;
  a disk fixing device comprising a main body having pushing devices for pushing an outer circumference of said platters, and an annular plate for covering a top portion of said platters, wherein said annular plate has a center hole formed therein for receiving said hub.

28. A disk fixing device as defined in claim 27, wherein said annular plate has a lever for moving said pushing devices to a first position to push said platters and to a second position for not pushing said platters.

29. For use in a disk drive recording device comprising first, second and third platters for storing magnetic recording data, a hub having said platters fixedly mounted thereon and a spindle motor connected to said hub for driving said hub with said platters mounted thereon, wherein an inside circumference of a center hole of said first platter has a gap at a portion contacting an outer circumference of said spindle motor in a first direction, an inside circumference of the center hole of said second platter has a gap at a portion contacting the outer circumference of said spindle motor in a second direction separated from said first direction by 120 degrees, and an inside circumference of a center hole of said third platter has a gap at a portion contacting the outer circumference of said spindle motor in a third direction separated from said second direction by 120 degrees;

a device for adjusting a balance of said first and second platters, comprising:

a cylindrical main body having a center hole for receiving said platters, said cylindrical main body having an inner wall surrounding said center hole and three guide holes provided at given intervals along said inner wall;

pushing means, one for each of said three guide holes, inserted into said three guide holes for pushing said platters; and an annular plate mounted in said center hole and having an annular plate lever disposed on a side of said annular plate for rotating said annular plate;

wherein, when said annular plate is rotated in a first direction, said pushing means pushes said platters; and wherein, when said annular plate is rotated in a second direction opposite to said first direction, said pushing means withdraws from said platters.

30. A device as defined in claim 29, wherein each said pushing means comprises a push pin mounted on said inner wall of said cylindrical main body, and a spring surrounding said push pin.

31. A device as defined in claim 30, wherein said push pins are mounted on said inner wall of said cylindrical main body at intervals of 120 degrees.

32. A device as defined in claim 30, further comprising three guide recesses formed on a periphery of said annular plate.

33. A device as defined in claim 32, wherein, when said annular plate is rotated in said first direction, said push pins are moved out of said guide holes into said guide recesses.

34. A device as defined in claim 32, wherein, when said annular plate is rotated in said second direction, said push pins are moved out of said guide recesses and into said guide holes.

35. A device as defined in claim 29, wherein, when said annular plate is rotated in said first direction, said pushing means moves out of said guide holes.

36. A device as defined in claim 29, wherein, when said annular plate is rotated in said second direction, said pushing means is moved into said guide holes.

37. A device as defined in claim 29, further comprising a holder installed on top of said annular plate.

\* \* \* \* \*